(12) United States Patent
Lingle et al.

(10) Patent No.: US 9,228,875 B2
(45) Date of Patent: Jan. 5, 2016

(54) LIQUID LEVEL DETECTION SYSTEM FOR A DRIVELINE COMPONENT

(71) Applicant: DEERE & COMPANY, Moline, IL (US)

(72) Inventors: Joseph F. Lingle, Dubuque, IA (US); Donald O. Johannsen, Dubuque, IA (US); Bruce L. Upchurch, Waterloo, IA (US); Keith N. Chaston, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 345 days.

(21) Appl. No.: 13/869,152

(22) Filed: Apr. 24, 2013

(65) Prior Publication Data

US 2014/0318236 A1 Oct. 30, 2014

(51) Int. Cl.
*G01F 23/00* (2006.01)
*G01F 23/04* (2006.01)
*G01F 23/26* (2006.01)
*E02F 9/26* (2006.01)

(52) U.S. Cl.
CPC ........ *G01F 23/0061* (2013.01); *G01F 23/0069* (2013.01); *G01F 23/0076* (2013.01); *G01F 23/04* (2013.01); *G01F 23/26* (2013.01); *E02F 9/267* (2013.01)

(58) Field of Classification Search
CPC . G01F 23/0061; G01F 23/0069; G01F 23/26; G01F 23/0076; G01F 23/04
See application file for complete search history.

(56) References Cited

U.S. PATENT DOCUMENTS

| 6,425,293 | B1 | 7/2002 | Woodroffe et al. |
|---|---|---|---|
| 6,617,968 | B1 | 9/2003 | Odisho et al. |
| 7,788,973 | B2 | 9/2010 | Quill |
| 7,937,998 | B2 | 5/2011 | Carr et al. |
| 2005/0248446 | A1 | 11/2005 | Watabe et al. |
| 2006/0033631 | A1 | 2/2006 | Cupples et al. |
| 2008/0173088 | A1 | 7/2008 | Quill |
| 2010/0261595 | A1* | 10/2010 | Schaefer et al. ............... 494/20 |

FOREIGN PATENT DOCUMENTS

| EP | 0589507 | 3/1994 |
|---|---|---|
| EP | 2144044 | 1/2010 |
| WO | WO96/19292 A1 | 6/1996 |

OTHER PUBLICATIONS

European Search Report dated Sep. 22, 2014 from related European Application No. 14165767.6.

* cited by examiner

*Primary Examiner* — Paul West

(57) ABSTRACT

The present disclosure relates to a detection system for detecting a liquid level in a rotating driveline component. The detection system may include a first sensor for detecting the liquid, a second sensor for detecting a rotational position of the driveline component, and a receiver for determining the liquid level based on the first and second sensors.

10 Claims, 4 Drawing Sheets

LIQUID LEVEL DETECTION SYSTEM FOR A DRIVELINE COMPONENT

FIELD

The present disclosure relates to liquid level detection, and more particularly to a system for detecting the oil level in a rotatable driveline component of a vehicle.

BACKGROUND AND SUMMARY

Vehicles often include mechanisms for determining the levels of fluids (e.g. air, oil, other liquids, etc.) in various vehicle components. For example, tire pressure monitoring systems include pressure sensors operative to detect the air pressure within a tire. Dipsticks are used to check the engine oil level. In rotating driveline components of vehicles, several methods of checking the oil or other liquid levels are used. A plug may be removed from the driveline component to check the oil level with the operator's finger or a dipstick. Alternatively, a sight glass or liquid gauge may be coupled to the rotating component to allow an operator to view the oil level in the component through a clear glass or tube. However, the threaded plug and sight glass are often difficult or cumbersome to access by the operator. Further, the sight glass is prone to leaking and/or being damaged. Further, the vehicle and driveline component must be stationary to determine the oil level using the threaded plug and sight glass mechanisms. Other mechanisms for fluid level detection often add more parts, cost, and complexity to the vehicle.

With many driveline components having large maintenance intervals, slow leaks in the components may go undetected for long periods. A slow leak eventually may lead to inadequate lubrication in the rotating component, potentially causing damage to the component. Replacement of driveline components is expensive and leads to undesirable and costly machine downtime.

According to an embodiment of the present disclosure, a liquid level detection system for a rotatable driveline component of a vehicle is provided. The system includes a sensing device coupled to the rotatable driveline component of the vehicle to rotate with the rotatable driveline component. The sensing device is positioned to detect a liquid in an interior region of the rotatable driveline component during a rotation of the rotatable driveline component. The sensing device is operative to transmit a signal representative of a liquid level in the interior region of the rotatable driveline component. The system further includes a receiver operative to receive the signal representative of the liquid level and to determine the liquid level in the interior region of the rotatable driveline component based on the signal.

BRIEF DESCRIPTION OF THE DRAWINGS

The above-mentioned and other features and advantages of the invention, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

While the oil level detection system of the present disclosure is described with respect to detecting the oil level in a final drive of a vehicle, the detection system may be used to detect the level of any liquid within any rotating device of a vehicle. For example, the detection system may be used to detect the oil or liquid level in other rotating driveline components, such as the differential, axle, transmission, or other suitable rotatable driveline components. Further, the detection system may be used to detect the level of a liquid within rotating devices in non-vehicle applications.

Figure 1:
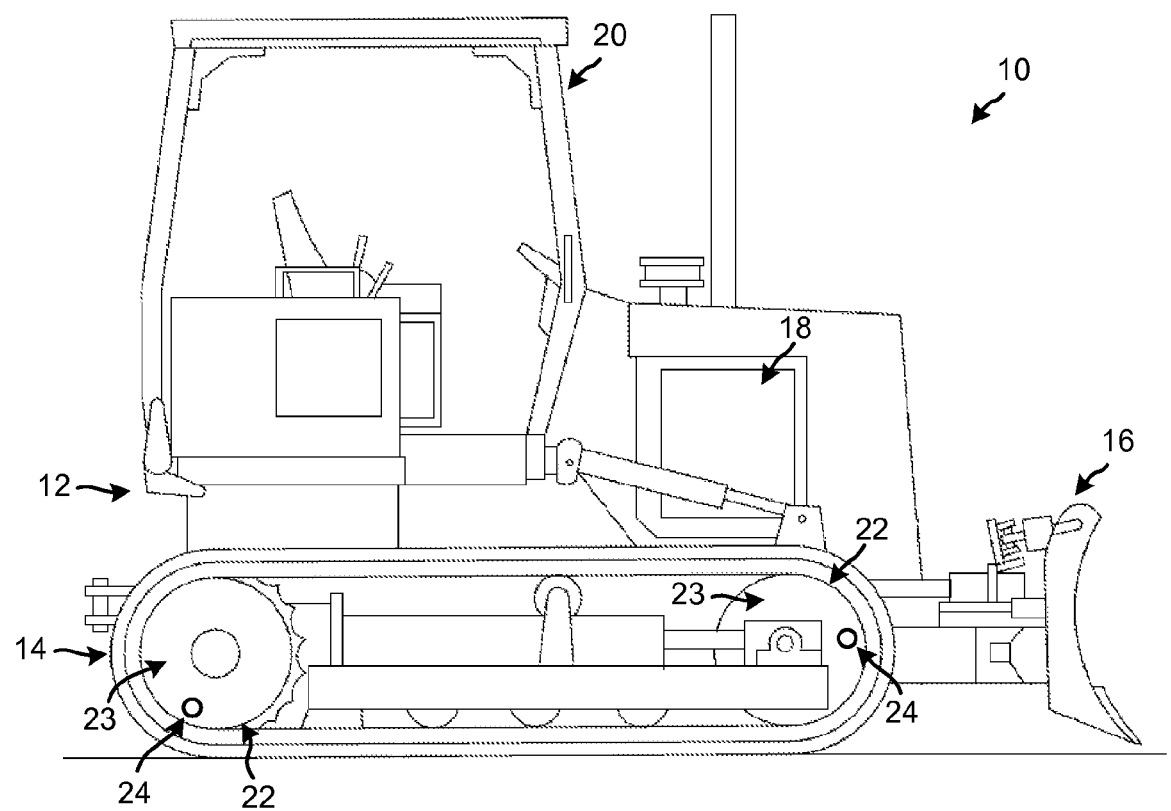
FIG. 1 illustrates an exemplary vehicle incorporating the liquid level detection system of the present disclosure.

Referring initially to FIG. 1, an exemplary work vehicle 10 is illustrated in the form of a bulldozer. Although vehicle 10 is illustrated and described herein as a bulldozer, vehicle 10 may also be in the form of a loader, an excavator, a motor grader, a tractor, a feller buncher, a crawler, a skidder, a forwarder, or another construction, agricultural, or utility vehicle, for example. Vehicle 10 includes at least one work tool, illustratively a front-mounted blade 16, for moving dirt and other materials. Other work tools may be provided.

Vehicle 10 includes a chassis 12 and an engine 18 supported by the chassis 12. At least one traction device 14 supports chassis 12 on the ground. In the illustrated embodiment, traction devices 14 include left and right tracks. Although traction devices 14 are in the form of tracks in FIG. 1, it is also within the scope of the present disclosure that fraction devices 14 may be in the form of wheels. Each of the left and right traction devices 14 are illustratively entrained around a pair of final drives 22. Final drives 22 are driven by engine 18 to drive the tracks 14. Final drives 22 each include a rotatable drum having an interior region that houses internal gearing, a differential, and other drive components for transferring torque from the driveline to the traction devices 14. Each final drive 22 is at least partially filled with oil to lubricate the internal final drive components. As illustrated, a sensing device 24 is coupled to an outer wall 23 of each final drive 22 for detecting an oil level within the corresponding final drive 22, as described herein.

Vehicle 10 further includes an operator cab 20 supported by chassis 12 to house and protect the operator of vehicle 10. Operator cab 20 may include a seat and various controls or user inputs (e.g., user interface 30 of FIG. 2) for operating vehicle 10.

Figure 2:
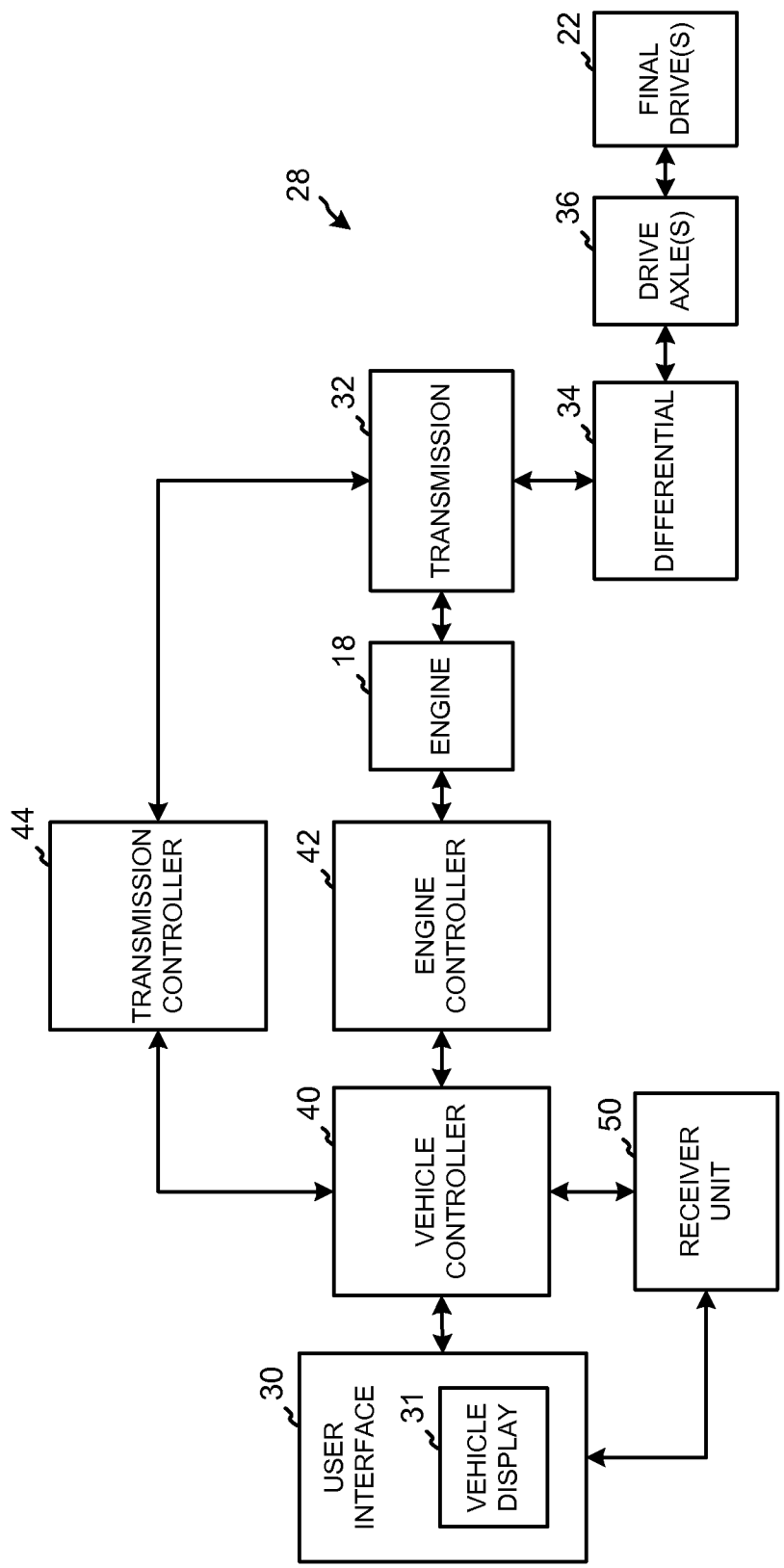
FIG. 2 illustrates a representative view of an exemplary driveline and control system of the vehicle of FIG. 1.

As illustrated in FIG. 2, vehicle 10 illustratively includes a vehicle or chassis controller 40 configured to control devices and systems of vehicle 10 and an engine controller 42 configured to control engine 18. Vehicle 10 illustratively also includes transmission controller 44 for controlling and modulating transmission 32. Vehicle controller 40 may communicate control signals to engine controller 42 for controlling engine 18, such as a throttle command based on an accelerator position, and to transmission controller 44 for controlling transmission 32. In the illustrated embodiment, each controller 40, 42, 44 includes a processor and memory containing software that when executed by the processor causes the processor to perform the controller functions described herein. Vehicle 10 may include fewer or additional controllers. For example, vehicle 10 may further include a hydraulics controller and an accessories controller.

A receiver unit 50 is in communication with vehicle controller 40 and user interface 30. Receiver unit 50 is operative to communicate with each sensing device 24 of FIG. 1 to detect an oil level in each final drive 22 of vehicle 10, as described herein. In one embodiment, user interface 30, controllers 40, 42, 44, and receiver unit 50 are all coupled on a controller area network (CAN) bus for communicating with each other.

As illustrated in FIG. 2, user interface 30 is provided for the operator to access vehicle controller 40 and/or engine controller 42, for example, to modify settings or to enter instructions. User interface 30 may be of conventional design, such as a keypad or control panel, and may be positioned within cab 20. User interface 30 includes a display 31 for providing an operator with vehicle information, such as vehicle speed, diagnostics, component oil levels, sensor information, and/or other vehicle parameters.

An exemplary driveline 28 of vehicle 10 is illustrated in FIG. 2 including engine 18, a transmission 32, a differential 34, drive axles 36, and final drives 22. Engine 18 is operative to drive rotation of final drives 22 to propel chassis 12 across the ground. In the illustrated embodiment, engine 18 is coupled to drive shafts or axles 36 via transmission 32 for driving left and right traction devices 14. In one embodiment, transmission 32 is an automatic transmission controlled and modulated by transmission controller 44, although other types of transmissions may be provided. Drive axles 36 are configured to provide torque from transmission 32 and engine 18 to final drives 22 for propelling vehicle 10. Differential 34 is illustratively coupled to the output of transmission 32 to allow left and right traction devices 14 to rotate at different speeds and/or directions.

Figure 3:
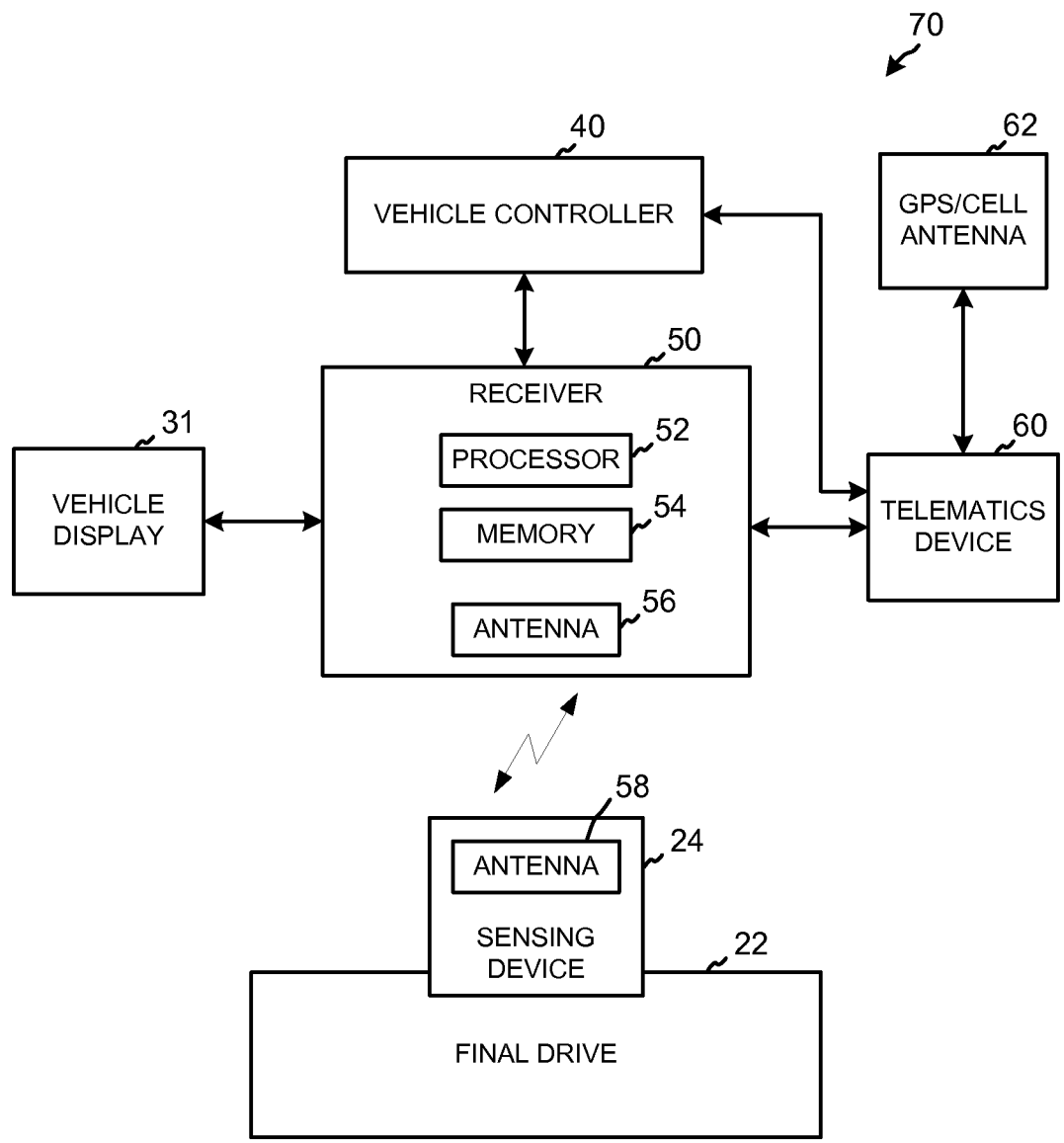
FIG. 3 illustrates a representative view of an exemplary liquid level detection system of the vehicle of FIG. 1.

Referring to FIG. 3, an exemplary oil level detection system 70 is illustrated for detecting an oil level in a final drive 22. Receiver unit 50 of oil level detection system 70 includes a processor 52 and memory 54 accessible by the processor 52. Memory 54 includes software with instructions executed by processor 52 to provide the functionality of receiver unit 50 described herein. In the illustrated embodiment, receiver unit 50 includes an antenna 56 for communicating wirelessly with sensing device 24. Sensing device 24 also includes a wireless antenna 58. In an alternative embodiment, receiver unit 50 and sensing device 24 may communicate via wired communication. In this embodiment, communication wires may be routed from sensing device 24 through internal passages in the interior of the final drive 22, for example, to receiver unit 50.

In one embodiment, wireless communication between receiver unit 50 and each sensing device 24 uses a radio frequency communication interface. In one embodiment, each sensing device 24 and receiver unit 50 (FIG. 3) communicate over a 2.4 GigaHertz (GHz) wireless network, although other suitable radio frequencies may be used. Each sensing device 24 includes a unique identifier such that receiver unit 50 may distinguish between the devices 24. The identifier may include an identification number or node address on the wireless network.

Receiver unit 50 cooperates with sensing device 24 to detect the oil level in final drive 22. In particular, receiver unit 50 determines the oil level in a final drive 22 based on one or more sensor outputs from the corresponding sensing device 24. Receiver unit 50 is operative to send the oil level information to vehicle display 31 for displaying the oil level to the operator on display 31 and/or generating low oil level warnings. In one embodiment, a more severe warning (e.g., flashing lights, audible alarm) is generated when the oil level reaches a very low level, such as a low level that increases the risk of damage to final drive 22. In one embodiment, receiver unit 50 further communicates the oil level data to vehicle controller 40, and vehicle controller 40 controls vehicle 10 based on the oil level data. For example, vehicle controller 40 may limit vehicle speed to a reduced maximum speed or limit or reduce other vehicle operations.

In one embodiment, receiver unit 50 generates a warning signal, such as an audible warning or a visual warning, and communicates the warning signal to display 31 to alert the operator when the detected oil level reaches a threshold level. For example, receiver unit 50 generates the warning signal upon the detected oil level in final drive 22 being below a low threshold or above a high threshold. In one exemplary embodiment, an optimal or target oil level of final drive 22 is about 50 percent full, i.e., 50 percent of the interior region of final drive 22 is filled with oil. In one embodiment, a low threshold oil level (under-fill) is about 25 percent full, and a high threshold oil level (over-fill) is about 75 percent full. Other suitable low and high thresholds may be implemented depending on the design and configuration of final drive 22. Further, multiple warning levels may be generated by receiver unit 50 based on additional oil level thresholds (e.g., low, very low, high, very high). For example, higher urgency warnings may be generated upon the oil level exceeding further past the low and high oil level thresholds.

In the illustrated embodiment, a telematics device 60 is in communication with vehicle controller 40 and receiver unit 50. Telematics device 60 includes a processor for controlling device 60 and memory accessible by the processor. Telematics device 60 is operative to collect vehicle data from vehicle controller 40 and receiver unit 50 (and/or other controllers) and to communicate the vehicle data over an antenna 62 (e.g., cellular or satellite) to a remote server computer for storage. A global positioning system (GPS) is coupled to antenna 62 and is operative to collect and record the vehicle location along with the time and to transmit this data over antenna 62. The remove server is accessible by a user, such as via a web browser of a computer. Telematics device 60 is operative to receive oil level data from receiver unit 50 and to transmit the oil level data to the remote server. As such, the oil level of final drives 22 of vehicle 10 may be remotely monitored and tracked in real time and historically via the server. In one embodiment, the remote server sends an email and/or a mobile phone text message to the vehicle owner, dealer, or maintenance group alerting of a low oil level detection.

Figure 4:
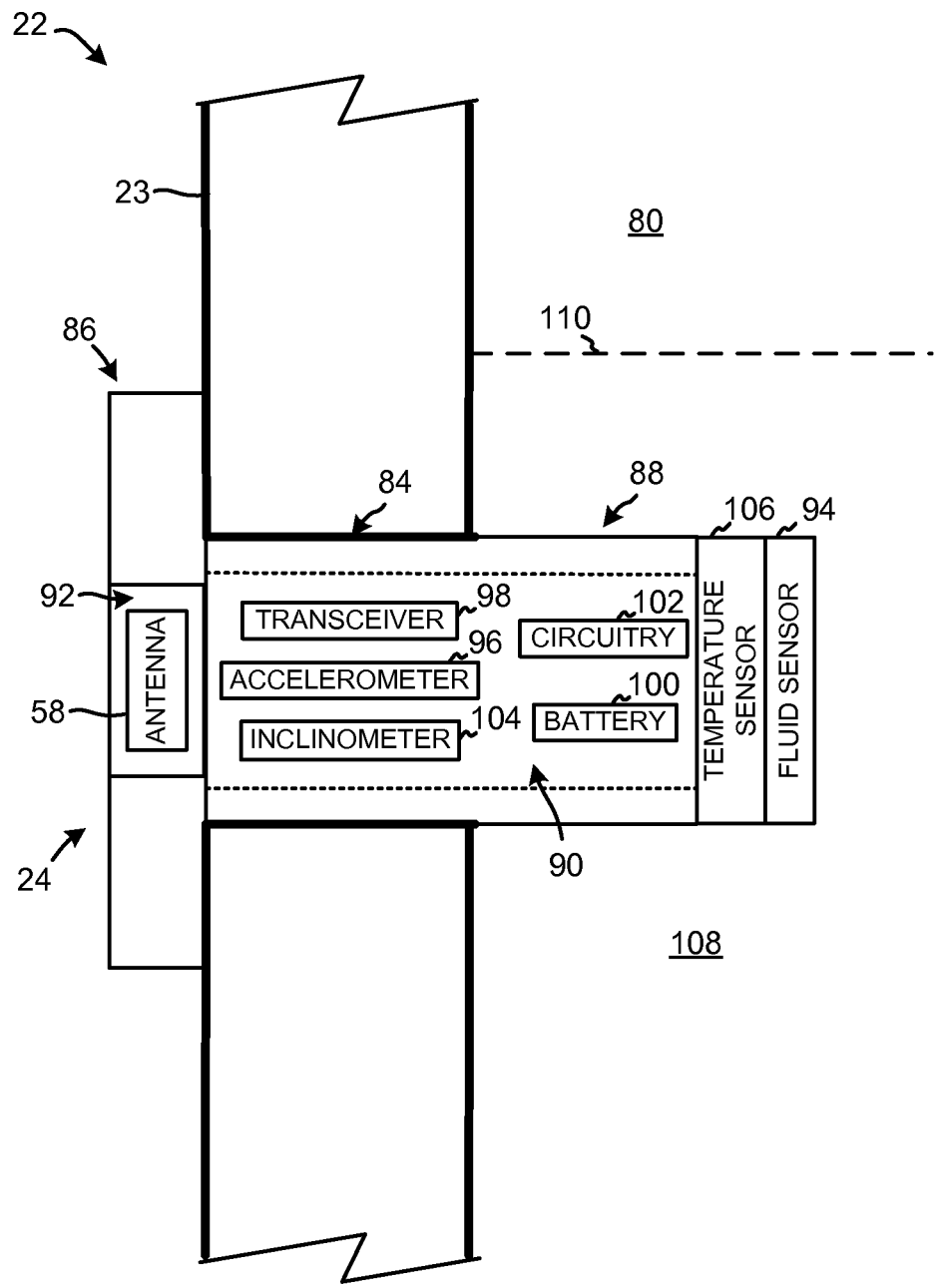
FIG. 4 illustrates an exemplary sensing device of the liquid level detection system of FIG. 3 positioned in a wall of a driveline component.

Referring to FIG. 4, an exemplary sensing device 24 is coupled to final drive 22 to detect an oil level in an interior region 80 of final drive 22. Sensing device 24 is received by an aperture 84 formed in an outer wall 23 (see also FIG. 1) of final drive 22 and extends into interior region 80. Oil 108 is illustrated in interior region 80 below line 110. In the exemplary embodiment, the housing of sensing device 24 is in the form of a hollow threaded plug or bolt sized be coupled to the threaded aperture 84 of wall 23. In one embodiment, threaded aperture 84 is the fill plug or drain plug hole of final drive 22. As such, the fill/drain plug hole 84 of final drive 22 serves as the sensor location, and the fill plug may be replaced with sensing device 24 without modification to final drive 22. As illustrated in FIG. 1, aperture 84 is located near the outer diameter of circular outer wall 23 of final drive 22. An o-ring seal (not shown) may be positioned between sensing device 24 and wall 23 for sealing the aperture 84 around sensing device 24.

In the illustrated embodiment, the housing of sensing device 24 includes a head portion 86 and a shaft portion 88 having a hollow interior region 90 for housing internal electronic components of sensing device 24. While head portion 86 illustratively protrudes outwardly from outer wall 23 when sensing device 24 is coupled to wall 23, outer wall 23 may include a recessed pocket surrounding aperture 84 sized to receive head portion 86 such that head portion 86 is substantially flush with the outer surface of wall 23. In one embodiment, head portion 86 and shaft portion 88 are made of steel. The housing of sensing device 24 serves to protect the electronics of sensing device 24 from oil and debris.

Head portion 86 includes a cavity where antenna 58 of sensing device 24 is positioned. Illustratively, antenna 58 extends outside of outer wall 23 of final drive 22. A polymeric or epoxy filler 92 or other non-metallic filler encapsulates antenna 58 in the cavity of head portion 86. Filler 92 provides a non-conductive housing surface and region around antenna 58 to allow the signals to exit the sensing device 24 without signal interference, such as during communication with receiver unit 50. Filler 92 also serves to increase the protection of antenna 58 from damage due to vibration or impact.

Sensing device 24 includes a fluid sensor 94 illustratively coupled to an end of shaft portion 88. In the illustrated embodiment, fluid sensor 94 detects the presence of oil at the end of shaft portion 88. For example, fluid sensor 94 detects oil that contacts sensor 94 or that is between sensing elements of sensor 94. In one embodiment, fluid sensor 94 is a capacitive sensor configured to detect the presence of oil between capacitive sensing elements protruding from an end of shaft portion 88. Fluid sensor 94 may include other suitable sensor types, such as an ultrasonic, infrared, or other suitable sensor for detecting a liquid. Sensor 94 is positioned inside outer wall 23 in the interior region 80 of final drive 22 such that oil in final drive 22 comes into contact with sensor 94.

Additional internal components of sensing device 24 positioned in interior region 90 include an accelerometer 96, a transceiver 98, a battery 100, circuitry 102, an inclinometer 104, and a temperature sensor 106. Transceiver 98 is operative to transmit signals from the sensors of sensing device 24 (e.g., accelerometer 96, fluid sensor 94, inclinometer 104, temperature sensor 106) to receiver unit 50 and to receive signals from receiver unit 50 via antenna 58. In one embodiment, battery 100 is a lithium battery. In one embodiment, circuitry 102 includes a processing device containing control logic for controlling the electronic components of sensing device 24 and for controlling communications with receiver unit 50 via transceiver 98. Battery 100 is operative to power the electronic components of sensing device 24. In one embodiment, a polymeric or epoxy filler encapsulates the internal electronic components within hollow region 90 to protect the components from damage due to vibration or liquid leaks, for example.

Accelerometer 96 is operative to detect a rotational position of final drive 22. Accelerometer 96 transmits a signal representative of the rotational position to receiver unit 50. Based on the signals received from accelerometer 96 and fluid sensor 94, receiver unit 50 is operative to determine the oil level in the interior region 80 of final drive 22. In particular, throughout a full 360-degree rotation of final drive 22, fluid sensor 94 is positioned in and out of the oil due to final drive 22 being partially filled with oil. Receiver unit 50 is operative to detect the oil level in final drive 22 based on the percentage of the full rotation of final drive 22 that oil is in contact with and detected by sensor 94.

Receiver unit 50 determines the start and end of the full rotation of final drive 22 based on the signal from accelerometer 96. In one embodiment, receiver unit 50 determines when sensor 94 detects oil and when sensor 94 does not detect oil during the full rotation based on the signal from sensor 94. Based on the percentage of the full rotation that sensor 94 detects oil and the corresponding percentage of the full rotation that sensor 94 does not detect oil, receiver unit 50 is operative to determine the oil level in final drive 22. Alternatively, the sensing unit 24 uses the accelerometer 96 to determine the full rotation of final drive 22, and sensing unit 24 (e.g., control logic of circuitry 102) calculates locally the percentage of the full rotation that sensor 94 detects oil and transmits the calculated percentage to receiver unit 50.

For example, if sensor 94 detects oil for 180 degrees of the 360-degree rotation of final drive 22, receiver unit 50 determines the oil level in final drive 22 is half-full. If sensor 94 detects oil for 90 degrees of the full rotation, receiver unit 50 determines that the oil level is at 25 percent full. In one embodiment, the oil level calculation is further based on the known geometry of the interior region 80 of final drive 22. For example, based on the internal structure of final drive 22, the positioning of sensor 94, and the fraction of the full rotation of final drive 22 that sensor 94 detects oil, receiver unit 50 is operative to calculate the oil level in final drive 22.

In one embodiment, fluid sensor 94 takes a continuous reading over the full 360-degree rotation of final drive 22 to detect the presence of oil. Alternatively, fluid sensor 94 may take a plurality of readings during the rotation of final drive 22 rather than a single continuous reading. Receiver unit 50 wirelessly receives each of the readings from sensor 94. The output of accelerometer 96 is used by receiver unit 50 as reference to determine when the full rotation is complete for starting and stopping oil detection readings with sensor 94.

In the illustrated embodiment, receiver unit 50 determines the oil level further based on the angle or orientation of vehicle 10. In particular, sensing device 24 includes an inclinometer 104 operative to detect the angle of vehicle 10, and thus final drive 22, relative to a level plane and to output a signal representative of the detected angle. Receiver unit 50 uses the output from inclinometer 104 to account for the orientation of final drive 22 when vehicle 10 is at a side-to-side (lateral) angle relative to the level plane. For example, when vehicle 10 is positioned at a side-to-side angle (e.g., driving across a slope), the oil in final drive 22 flows towards one end of interior region 80. To account for the angle of final drive 22, receiver unit 50 is operative to adjust the calculated oil level based on the detected inclination angle and the known geometry of final drive 22.

At some steep side-to-side angles of vehicle 10, the oil in final drive 22 shifts to one end such that sensor 94 detects oil (or does not detect oil) for the entire 360-degree rotation of final drive 22. In one embodiment, detection system 70 does not measure or ignores the oil level when vehicle 10 is at these side-to-side angles. In one embodiment, inclinometer 104 is further used to detect the front-to-back angle of vehicle 10 for use in determining the oil level in final drive 22. For example, the front-to-back angle may be used when determining the oil level in final drive 22 over a partial rotation of final drive 22, as detailed further below. In one embodiment, inclinometer 104 and accelerometer 96 are provided as a single sensing device, such as a three-axis accelerometer/inclinometer.

In an alternative embodiment, receiver unit 50 determines the oil level based on the outputs from accelerometer 96 and fluid sensor 94 and does not adjust the oil level calculation based on the detected angle. Rather, when the side-to-side angle of vehicle 10 exceeds a threshold angle (e.g., 5 degrees) in this embodiment, oil level detection system 70 does not take oil level measurements. By stopping oil level measurements at vehicle angles greater than the threshold angle, detection system 70 conserves the life of battery 100 and reduces the likelihood of false oil level readings due to the shift of oil in final drive 22. In this embodiment, detection system 70 resumes the oil level detection upon vehicle 10 returning to substantially level ground.

Sensing device 24 further includes a temperature sensor 106 operative to detect a temperature within interior region 80 of final drive 22. Temperature sensor 106 may include a thermistor or another suitable sensor operative to detect fluid temperature. In one embodiment, oil level detection system 70 is operative to take oil level readings only when the detected temperature in interior region 80 is greater than a threshold temperature. For example, when vehicle 10 is started in a cold environment, receiver unit 50 waits until the temperature in interior region 80 reaches the temperature threshold before taking oil level measurements. Disabling oil level measurements at temperatures below the temperature threshold reduces the likelihood that receiver unit 50 will calculate false readings due to the higher viscosity of the oil in colder temperatures. An exemplary temperature threshold for disabling oil level readings is less than zero degrees Celsius, although any suitable thresholds may be implemented.

In one embodiment, sensing device 24 takes oil level measurements periodically when vehicle 10 is being operated. An exemplary periodic measurement is once every hour or half-hour, or at any other suitable period. In between measurements, sensing device 24 enters a low-power (sleep) mode where some or all of the internal electronics are powered off to conserve battery life. In one embodiment, sensing device 24 includes a timer device operative to trigger the periodic measurements. In another embodiment, receiver unit 50 transmits a request for oil detection at each interval to sensing device 24, and sensing device 24 takes the oil readings over the 360-degree rotation upon receipt of the request. In one embodiment, periodic measurements serve to extend the life of battery 100 compared with continuous or more frequent measurements. Based on the measured oil level at each periodic interval, receiver unit 50 is operative to detect an oil leak in final drive 22 based on declining oil levels over the history of measurements.

In one embodiment, sensing device 24 is operative to enter the low-power mode upon determining that vehicle 10 is stationary or powered off. For example, when accelerometer 96 does not detect rotation of final drive 22, circuitry 102 of sensing device 24 determines that final drive 22 is not moving and causes sensing device 24 to enter the low-power mode until rotation of final drive 22 is detected. In another example, sensing device 24 determines if vehicle 10 is powered off based on whether receiver unit 50 is active. For example, sensing device 24 may determine receiver unit 50 is inactive based on whether receiver unit 50 responds with an acknowledgement signal to a message sent from sensing device 24. In one embodiment, receiver unit 50 is operative to transmit an activate signal to sensing device 24 upon receiver unit 50 being powered on. Upon receipt of the signal, sensing device 24 exits the low-power mode. In one embodiment, sensing device 24 takes an initial oil-level measurement upon receiving the initial activate signal from receiver unit 50 and takes the periodic measurements thereafter.

In one embodiment, oil level detection system 70 further implements a vehicle speed threshold for oil level measurements. In particular, receiver unit 50 receives vehicle speed data from vehicle controller 40 (FIG. 3). In some embodiments, the likelihood of oil splashing within final drive 22 increases at higher rotational speeds of final drive 22. Oil splash may reduce the reliability or accuracy of the oil detection provided with sensor 94. As such, receiver unit 50 ignores oil readings from sensing device 24 when the detected rotational speed of final drive 22 exceeds the speed threshold. Receiver unit 50 may alternatively disable oil readings when the speed threshold is exceeded by sending a deactivation signal to sensing device 24 instructing device 24 to enter the low-power mode. In this embodiment, receiver unit 50 sends an activation signal to sensing device 24 upon the speed dropping back below the threshold to re-enable the oil readings.

In one embodiment, because oil level readings are taken with sensing device 24 over a complete 360-degree rotation, the precise orientation or angle of sensing device 24 relative to final drive 22 is not considered in the oil level calculation. In an alternative embodiment, sensing device 24 and receiver unit 50 cooperate to determine the oil level in final drive 22 over a partial rotation of final drive 22. In this embodiment, the precise orientation of sensing device 24 relative to final drive 22 is known. Based on the known sensor orientation, receiver unit 50 determines the oil level based on oil detection readings from fluid sensor 94 during a rotation of final drive 22 from a first rotational angle to a second rotational angle, where the rotational distance between the two angles is less than 360 degrees.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. A liquid level detection system for a rotatable driveline component of a vehicle, the system including:
   a sensing device configured to transmit a signal during a rotation of the rotatable driveline component, wherein the signal includes a liquid value from a first sensor and a rotation value from an accelerometer of a second sensor, the first sensor and the second sensor being positioned within the interior region of the rotatable driveline component; and
   a receiver configured to receive the signal and to determine the liquid level in the interior region of the rotatable driveline component based on the liquid value and a rotational position of the rotatable driveline component based on the rotation value.

2. The system of claim 1, wherein the receiver is operative to detect a complete rotation of the rotatable driveline component based on the rotation value and to determine the liquid level based on a plurality of readings from the first sensor taken during the complete rotation of the rotatable driveline component.

3. The system of claim 2, wherein the receiver is operative to determine a portion of the complete rotation of the rotatable driveline component that the first sensor detects the liquid and to determine the liquid level based on the portion.

4. The system of claim 1, wherein the receiver is operative to generate a warning signal upon the liquid level reaching a threshold level.

5. The system of claim 1, wherein the sensing device includes an antenna operative to transmit the signal wirelessly to the receiver.

6. The system of claim 5, wherein the antenna extends outside of the rotatable driveline component.

7. The system of claim 1, wherein the sensing device is coupled to a wall of the rotatable driveline component, and the wall forms the interior region of the rotatable driveline component.

8. The system of claim 7, wherein the sensing device includes a threaded plug having a hollow portion for receiving sensor components, and the wall of the rotatable driveline component includes a threaded aperture sized to receive the threaded plug to couple the sensing device to the rotatable driveline component.

9. The system of claim 1, wherein the receiver is mounted to the vehicle remotely from the sensing device and is coupled to a communication network of the vehicle.

10. The system of claim 1, wherein the rotatable driveline component includes a final drive coupled to a traction device of the vehicle, and the sensing device is operative to detect oil in the interior region of the final drive.

\* \* \* \* \*